United States Patent [19]

Kosak

[11] 4,020,107
[45] Apr. 26, 1977

[54] CATALYTIC REDUCTION OF HALONITROAROMATIC COMPOUNDS

[75] Inventor: John R. Kosak, Greenville, Del.

[73] Assignee: E. I. Du Pont de Nemours and Co., Wilminton, Del.

[22] Filed: Apr. 7, 1975

[21] Appl. No.: 565,945

[52] U.S. Cl. .................................. 260/580; 260/689
[51] Int. Cl.$^2$ .................. C07C 85/11; C07B 29/00
[58] Field of Search ................................... 260/580

[56] References Cited

UNITED STATES PATENTS

| | | | |
|---|---|---|---|
| 3,474,144 | 10/1969 | Craig et al. | 260/500 |
| 3,522,309 | 7/1970 | Kirby | 260/577 |
| 3,803,054 | 4/1974 | Habig et al. | 260/580 X |

FOREIGN PATENTS OR APPLICATIONS

| | | | |
|---|---|---|---|
| 7,311,193 | 8/1973 | Netherlands | 260/580 |

*Primary Examiner* — Daniel E. Wyman
*Assistant Examiner* — John J. Doll

[57] ABSTRACT

Halonitroaromatic compounds are reduced in the liquid phase with hydrogen, a palladium or platinum catalyst and a dehalogenation-suppressing amount of a compound of the formula

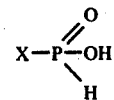

wherein X is H, OH, alkyl, phenyl or mono- or dialkylphenyl.

12 Claims, No Drawings

CATALYTIC REDUCTION OF HALONITROAROMATIC COMPOUNDS

BACKGROUND OF THE INVENTION

1. Field of the Invention

This invention relates to the catalytic reduction (hydrogenation) of halonitroaromatic compounds.

2. Description of the Prior Art

It is recognized in the art that the catalytic reduction of a halogen substituted aromatic nitro compound to the halogen substituted amine may be difficult to achieve because of the occurrence of extensive dehalogenation during the process. For example, Baltzley and Phillips disclose in the Journal of the American Chemical Society 68, 261 (1946) that removal of halogen atoms during catalytic hydrogenations of organic compounds is a familiar phenomenon and that most workers have considered such loss of halogen as inevitable. U.S. Pat. No. 2,791,613 discloses that hydrogenation processes are not generally suitable for converting halonitrobenzenes to haloanilines, primarily because considerable dehalogenation accompanies the reduction reaction. The patent further discloses that a meta-halonitrobenzene can be reduced to the corresponding aniline derivative with a minimum of dehalogenation by employing a copper-chromium oxide catalyst. U.S. Pat. No. 2,772,313 discloses a catalytic process employing rhodium for converting halonitrobenzenes to haloanilines with a minimum of dehalogenation. U.S. Pat. No. 3,073,865 discloses the hydrogenation of halogen substituted aromatic nitro compounds to the corresponding amines, the process being carried out in the presence of a platinum on carbon catalyst and controlled amounts of magnesium oxide or magnesium hydroxide to suppress dehalogenation. U.S. Pat. No. 3,145,231 discloses a process for reducing halogen substituted nirtoaromatic compounds with a minimum of dehalogenation, the process employing a platinum catalyst and a cycloaliphatic base, for example, morpholine. U.S. Pat. No. 3,474,144 discloses a catalytic hydrogenation process for producing chloroaniline. The process employs, for example, a nickel, platinum or palladium catalyst and triphenyl phosphite or tritolyl phosphite as a dechlorination inhibitor. Netherlands Patent Publication No. 73/11193 discloses the use of oxyacids of trivalent or pentavalent phosphorus and strong bases, or the corresponding salts, to maintain the pH at 6–7.5 during the nickel-catalyzed reduction of halogen substituted nitrobenzenes.

SUMMARY OF THE INVENTION

In summary, this invention resides in a process for minimizing the formation of dehalogenated products during the preparation of a halogen substituted aromatic amine by the catalytic hydrogenation of a mononitro aromatic hydrocarbon compound having 6–14 ring carbon atoms and 1–2 halogen atoms substitutuents, which process comprises effecting the reduction of the nitro compound at a temperature of 25°–200° C. and a hydrogen gas pressure of at least about 100 p.s.i.g. in the presence of at least a catalytic amount of a palladium or platinum catalyst and 0.01–10 weight %, based on the weight of the nitro compound, of an acidic phosphorus compound of the formula

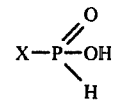

wherein X is H, OH, $C_{1-12}$ alkyl, phenyl or

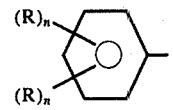

wherein $n$ is 0 or 1 and R is $C_{1-3}$ alkyl.

DETAILED DESCRIPTION OF THE INVENTION

The invention in the process recited above resides primarily in the use of a small amount of the compound of said formula

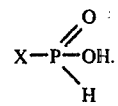

Operable compounds falling within the formula include phosphorous acid, also known as phosphonic acid, X being OH; hypophosphorous acid, also known as phosphinic acid, X being H; alkylphosphinic acids, X being $C_{1-12}$ alkyl; phenylphosphinic acid, X being phenyl; and monoalkyl-and dialkylphenylphosphinic acids, $n$ being 0 or 1 and R being $C_{1-3}$ alkyl. Procedures for hydrogen reduction of aromatic nitro compounds are well known. The invention process requires little or no alteration in such known basic procedures. Either batch or continuous processes can be carried out. The phosphorus compound, which effectively suppresses dehalogenation, can be used in amounts as little as 0.01 weight % of the nitro compound. No adverse effect, except for waste of the compound, is apparent even when much larger amounts of the compound, about 5–10 weight % of the nitro compound, are used. The process is conveniently conducted without difficulty in conventional equipment, with or without solvents. Generally, the reaction vessel is charged with the nitro compound, the catalyst and the phosphorus compound and hydrogen gas is then passed into the system under super-atmospheric pressure as the reactants are agitated vigorously and heated. The reaction is substantially complete when hydrogen uptake ceases and analysis for aromatic halonitro compound shows less than about 0.2 mole % unreduced material present. After completion of the reaction the reduction mass is filtered to recover the catalyst and the amine product is separated from the water of reaction and dried. The amine product can be purified by distillation if an extremely high quality product is desired. The temperatures and pressures of hydrogenation can vary widely. Preferred operating temperatures are in the range 25°–150° C. Temperatures below about 25° C. and higher than about 200° C. are generally considered impractical. The operating temperature usually is chosen so that the reaction mass is liquid during the reduction; it will vary with the particular nitro compound being hydrogenated, the phosphorus compound employed and the choice of solvent, if one is used. Hydrogenation pressures of about 200–600 p.s.i.g. are preferred. Satisfactory results are not always attained at pressures below about 100 p.s.i.g., and pressures above about 700 p.s.i.g. are normally unnecessary. One significant and practical feature of this process is that a solvent is not ordinarily required. However, if desired, a solvent, such as water, a lower alkanol (methanol, ethanol, propanol, butanol) or a water-miscible ether (tetrahydrofuran, dioxane), can be used.

The catalyst can consist substantially of the palladium or platinum metal itself or the metal can be disposed on an inert support, such as a carbon black diatomaceous earth. The initial charge is conveniently the metal oxide which under the conditions of the hydrogenation is reduced to the active metal. Preferably, the catalyst consists of platinum or palladium supported on carbon. Supported catalysts can be prepared by any of the methods known in the art, for example, by procedures which involve (a) impregnating the support with a platinum metal salt by evaporating a solution of the salt in the presence of the support, (b) precipitating the metal (as the hydroxide) in the presence of the support by adding a metal chloride solution to a hot alkaline solution in which the support is suspended or, preferably, (c) adding bicarbonate to a solution of metal chloride in water containing suspended carbon and heating to precipitate the hydroxide onto the carbon which is then filtered off. Supported metallic oxides or hydroxides can be used as such or they first can be reduced to the metal, for example, by hydrogenation or by treatment with a chemical reducing agent such as formaldehyde. The carbon support can be any porous or non-porous amorphous material. Oleophilic carbons have the advantage of giving increased reduction rates, as described, for example, in U.S. Pat. No. 2,823,235. Such highly oleophilic carbons are known as acetylene blacks and conductive furnace blacks. Other carbons, such as the furnace blacks and the activated carbons of vegetable or animal origin, for example, as disclosed in U.S. Pat. No. 3,073,865, can be used.

Generally, the concentration of metal on the support is 0.5–5 weight %, preferably about 1 weight %. The weight ratio of nitro compound to metal is ordinarily maintained above 10,000:1 but below about 100,000:1 Preferred ratios are in the range 25,000:1 to 75,000:1. The minimum effective amount of catalyst is used because of the high cost of the catalyst metals. Platinum is the preferred catalyst metal. A catalyst concentrate containing about 5–10 weight % of platinum conveniently can be prepared and then diluted upon usage, for example, as disclosed in the previously cited U.S. Pat. Nos. 2,823,235 and 3,073,865. These patents provide general discussions on the preparation of both platinum and palladium catalysts.

The invention process can be used to reduce fluoronitro, chloronitro, bromonitro and iodonitro aromatic compounds having 6–14 ring carbon atoms and one nitro and 1–2 halogen atom ring substituents with excellent and practical suppression of dehalogenation. In general, dehalogenation can readily be limited to less than 0.1 mole percent under preferred conditions. With compounds especially sensitive to dehalogenation, for example, bromo- and iodonitro compounds, slightly greater dehalogenation may occur. The halonitroaromatic compounds which can be reduced by this process include monocyclic and polycyclic aromatic compounds having 6–14 ring carbon atoms, for example, derivatives of benzene, naphthalene, anthracene, biphenyl, acenaphthene or phenanthrene. This process is particularly applicable to the reduction of chloro and bromo substituted nitrobenzenes and nitroalkylbenzenes containing 6–10 ring carbon atoms and 1 or 2 halogen atoms, for example, p-nitrochlorobenzene, o-nitrochlorobenzene, m-nitrochlorobenzene, m-nitrobromobenzene, 2-chloro-4-nitrotoluene, 4-chloro-2-nitrotoluene, 3-chloro-4-nitroethylbenzene, 4-bromo-2-nitrotoluene, 2,4-dichloronitrobenzene, 3,4-dichloronitrobenzene, 3,5-dichloronitrobenzene, 4-chloro-6-nitro-m-xylene, 3-chloro-4-nitropropylbenzene, 3-chloro-4-nitrobutylbenzene, m-nitroiodobenzene, o-nitrobromobenzene, 4-iodo-2-nitrotoluene, 4-bromo-6-nitro-m-xylene, 3,5-dibromonitrobenzene and 1-nitro-6-chloronaphthalene. As is obvious from the above, the aromatic ring can include alkyl substituents. Usually, only 1 or 2 alkyl substituents will be present, each alkyl group usually containing 1–4 carbon atoms. Among the alkyl substituted aromatic compounds which can be used herein, the mono- and dialkyl substituted compounds, each group having 1–4 carbon atoms, are preferred because of their more ready availability.

The effectiveness of the phosphorus compounds as dehalogenation inhibitors appears to be related to the presence of the acidic group

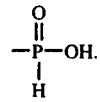

Phosphorous acid can be employed effectively at about 0.025% by weight of the nitro compound being reduced. Amounts of phosphorous acid as high as 6.2% can be used without adverse effect. The preferred amount of dehalogenation suppressant is about 0.04–0.2 weight %. It is necessary to use slightly more of the additive with palladium catalysts than with platinum catalysts. After completion of the reduction, the aqueous part of the reaction mass ordinarily has a pH of no greater than 3 since the reduction is carried out in an acidic environment.

In the following examples parts and percentages are by weight unless otherwise indicated.

EXAMPLE 1

A titanium autoclave equipped with a jacket for heating, coils for circulating temperature controlled water and an efficient agitator was charged with 300 parts of 3,4-dichloronitrobenzene, 0.30 part of phosphorous acid and 0.006 part of platinum (the actual charge consisting of an aqueous paste of platinum deposited on a carbon support, the quantity of platinum on the support being 5.0 weight % on a dry basis). Air in the autoclave and lines was displaced by pressuring with nitrogen and releasing the pressure through a vent system. The nitrogen was then displaced by pressurizing with hydrogen to 300 p.s.i.g. and releasing the pressure as before. The temperature of the mixture was then raised to 90° C., the agitator was started and the hydrogen pressure was increased to about 500 p.s.i.g. Absorption of hydrogen was rapid with evolution of heat; the temperature of the reaction mass was held at 115° ± 5° C. by circulating low pressure steam through the coils. The autoclave was repressured with hydrogen to 500 p.s.i.g. after each 100 lb. drop in pressure. When no further hydrogen absorption occurred, the mass was held at the operating temperature and 500 p.s.i.g. hydrogen pressure for 15–30 minutes. The total hydrogenation time was 1.25–1.50 hours. The hot reduction mass was cooled to below 100° C., removed from the autoclave, treated with ammonium hydroxide (to a pH above 7.0) and then filtered. The filtrate was allowed to settle at 70°–85° C. and the layers were separated. Analysis of the organic layer by gas chromatography showed the presence of 0.04 mole % of dechlorination products. If desired, the dichloroaniline product can be distilled in the presence of 2 weight % soda ash and 0.25 weight % tetraethylenepentamine, for example, as described in U.S. Pat. No. 2,911,340, to give 3,4-dichloroaniline of greater than 98% purity in greater than 90% yield.

EXAMPLE 2

Following the general procedure of Example 1, a mixture consisting of 600 parts of p-nitrochlorobenzene, 1.2 parts of phosphorus acid and 0.012 part of platinum was hydrogenated at 110° ± 5° C. The p-chloroaniline product layer, after isolation, was analyzed by gas chromatography and found to contain 0.02 mole % of dechlorination product (aniline). Purity of the crude product was 99.1%.

EXAMPLE 3

Following the general procedure of Example 1, a mixture consisting of 300 parts of o-nitrochlorobenzene, 0.60 part of phosphorous acid and 0.006 part of platinum was hydrogenated at 110°–120° C. The o-chloroaniline product layer, after isolation, was analyzed by gas chromatography and found to contain only a trace of aniline. Purity of the crude product was 98.4%.

EXAMPLE 4

Except as follows, the procedure of Example 1 was repeated. The autoclave was constructed of Hastelloy C. The charge consisted of 300 parts of 3,4-dichloronitrobenzene crude (containing 88% of the 3,4-dichloro and 12% of the 2,3-dichloro isomers), 0.3 part of phosphorous acid and 0.0045 part of platinum. The temperature of the reaction mass was held at 106°–108° C. The total hydrogenation time was 124 minutes. The filtrate from the reaction mass was allowed to settle at 70°–90° C. and the layers were separated. Analysis of the dichloroaniline organic layer by gas chromatography showed the presence of 0.05 mole % of dechlorination products.

EXAMPLE 5

Except as follows, the procedure of Example 4 was repeated. The autoclave was constructed of Inconel 600. The charge consisted of 300 parts of 3,4-dichloronitrobenzene crude, 1.0 part of phenylphosphinic acid and 0.006 part of palladium (the actual charge consisting of an aqueous paste of palladium deposited on a carbon support, the ratio of palladium to carbon being 5/95). The temperature of the reaction mass was held at 105°± 5° C. The total hydrogenation time was 73 minutes. Analysis of the dichloraniline organic layer product by gas chromatography showed the presence of 1.07 mole % of dechlorination products.

EXAMPLE 6

Following the general procedure of Example 1, a mixture consisting of 300 parts of 3,4-dichloronitrobenzene, 0.06 part of phosphorous acid and 0.006 part of palladium (described in Example 5) was hydrogenated at 105° ± 5° C. The 3,4-dichloroaniline product layer, after isolation, was analyzed by gas chromatography and found to contain 0.40 mole % of dechlorination products (aniline and monchloroaniline isomers.

EXAMPLE 7

Following the general procedure of Example 1, a mixture consisting of 300 parts of 3,4-dichloronitrobenzene crude (described in Example 4), 1.2 parts of phosphorous acid and 0.006 part of platinum was hydrogenated at 110° ± 5° C. Total reduction time was 2.0 hours. The dichloroaniline product layer, after isolation, was analyzed by gas chromatography and found to contain 0.04 mole % of dechlorination products (aniline and monochloroaniline isomers).

EXAMPLE 8

Following the general procedure of Example 1, a mixture consisting of 300 parts of 6-chloro-2-nitrotoluene, 0.60 part of phosphorous acid and 0.006 part of platinum was hydrogenated at 105° ± 5° C. Total hydrogenation time was about 2.0 hours. The 6-chloro-2-aminotoluene product layer, after isolation, was analyzed by gas chromatography and found to contain 0.05 mole % of dechlorination products. Purity of the crude product was 98.9%.

EXAMPLE 9

Following the general procedure of Example 1, a mixture consisting of 300 parts of 2,5-dichloronitrobenzene, 0.45 part of phosphorous acid and 0.006 part of platinum was hydrogenated at 90°–100° C. Total hydrogenation time was 4 hours. The 2,5-dichloroaniline product layer, after isolation, was analyzed by gas chromatography and found to contain 0.37 mole % of dechlorination products. Purity of the crude product was 98.4%.

EXAMPLE 10

Following the general procedure of Example 1, a mixture consisting of 40.4 parts of p-bromonitrobenzene, 160 parts of methanol, 0.07 part of phosphorous acid and 0.0002 part of platinum was hydrogenated at 40°–50° C. The p-bromoaniline product, after isolation, was analyzed by gas chromatography and found to contain 0.06 mole % of aniline. Purity of the p-bromoaniline crude product was 99.4%; it contained 0.5% of o-bromoaniline (derived from the o-bromonitrobenzene in the p-bromonitrobenzene).

EXAMPLE 11

Following the general procedure of Example 1, a mixture consisting of 45 parts of m-iodonitrobenzene, 320 parts of methanol, 0.14 part of phosphorous acid and 0.008 part of platinum was hydrogenated at 50°–55° C. The product layer, after isolation, was analyzed by gas chromatography and found to contain 2.5 mole % of aniline and 93 mole % of m-iodoaniline. The structure of the m-iodoaniline was confirmed by infrared analysis.

EXAMPLE 12

Following the general procedure of Example 1, mixtures containing 300 grams of 3,4-dichloronitrobenzene crude (described in Example 4), 0.45 gram of phosphorous acid (as a 70% aqueous solution) and 0.006 gram of platinum were hydrogenated at the temperatures shown in the following table. The effect of temperature on rate of reduction and extent of dechlorination is shown in the table.

| Temperature | Reduction Rate Moles H₂/g.Pt/min. | Dechlorination (mole %) |
| --- | --- | --- |
| 115 ± 5° C. | 8.7 | less than 0.01 |
| 125 ± 5° C. | 11.7 | 0.02 |
| 140 ± 5° C. | 15.0 | 0.05 |

EXAMPLE 13

Using the general procedure described in Example 1, reductions were carried out at 105°–115° C. employing 300 parts of o-nitrochlorobenzene, 0.006 part of platinum and 0.30 part of various phosphorous compounds of the aforesaid formula. The results are shown in the following table.

| Phosphorus Compound | Purity of Crude o-Chloroaniline Product (%) | % Dehalogenation (aniline |
| --- | --- | --- |
| Phosphorous acid | 97.3 | 0.02 |
| Hypophosphorous acid | 95.2 | 0.02 |
| Phenylphosphinic acid | 92.8 | 1.2 |

I claim:

1. Improved process for minimizing dehalogenation during the catalytic hydrogenation of a mononitro aromatic hydrocarbon having 6 to 14 ring carbon atoms and 1 or 2 halogen atom substituents, at a temperature of 25° to 200° C and a pressure of 100 to 700 psig, the catalyst being a platinum or palladium catalyst, the amount of catalyst being such that the weight ratio of nitro compound being hydrogenated to catalyst metal is between 10,000:1 and 100,00:1, the improvement consisting essentially of carrying out the hydrogenation in the presence of 0.01 to 10 weight %, based on the weight of nitro compound being hydrogenated, of an acidic phosphorus compound of the formula

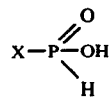

wherein X is H, OH, $C_{1-12}$alkyl, phenyl or

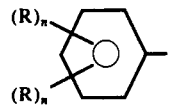

wherein each n is 0 or 1 and R is $C_{1-3}$ alkyl, said amount of acidic phosphorus compound being such that the pH of the reaction mass after hydrogenation is no greater than 3.

2. Process of claim 1 wherein the temperature is 25° to 150° C., the hydrogen pressure is 200 to 600 p.s.i.g. and the catalyst is a carbon supported catalyst.

3. Process of claim 2 wherein the supported catalyst contains 0.5 5 weight % platinum or palladium.

4. Process of claim 1 wherein the phosphorus compound is phosphorous acid.

5. Process of claim 1 wherein the phosphorus compound is hypophosphorous acid.

6. Process of claim 1 wherein the phosphorus compound is phenylphosphinic acid.

7. Process of claim 1 wherein the mononitro compound is a nitrobenzene.

8. Process of claim 7 wheren the mononitro compound is 2,5-dichloronitrobenzene.

9. Process of claim 7 wherein the mononitro compound is 3,4-dichloronitrobenzene.

10. Process of claim 7 wherein the mononitro compound is p-nitrochlorobenzene.

11. Process of claim 7 wherein the mononitro compound is o-nitrochlorobenzene.

12. Process of claim 7 wherein the mononitro compound is 6-chloro-2-nitrotoluene.

* * * * *

UNITED STATES PATENT OFFICE
CERTIFICATE OF CORRECTION

PATENT NO. : 4,020,107
DATED : April 26, 1977
INVENTOR(S) : John R. Kosak

It is certified that error appears in the above-identified patent and that said Letters Patent are hereby corrected as shown below:

Column 7, line 41, "100,00:1" should be -- 100,000:1 --.
Column 8, line 24, "0.5 5" should be -- 0.5 to 5 --.

*Signed and Sealed this*

*twenty-third* Day of *August 1977*

[SEAL]

Attest:

RUTH C. MASON
*Attesting Officer*

C. MARSHALL DANN
*Commissioner of Patents and Trademarks*